April 6, 1954   A. H. WYLIE   2,674,425
QUICK CHANGE MOTOR MOUNT WITH AUTOMATIC BELT TIGHTENER
Filed March 2, 1951   2 Sheets-Sheet 1
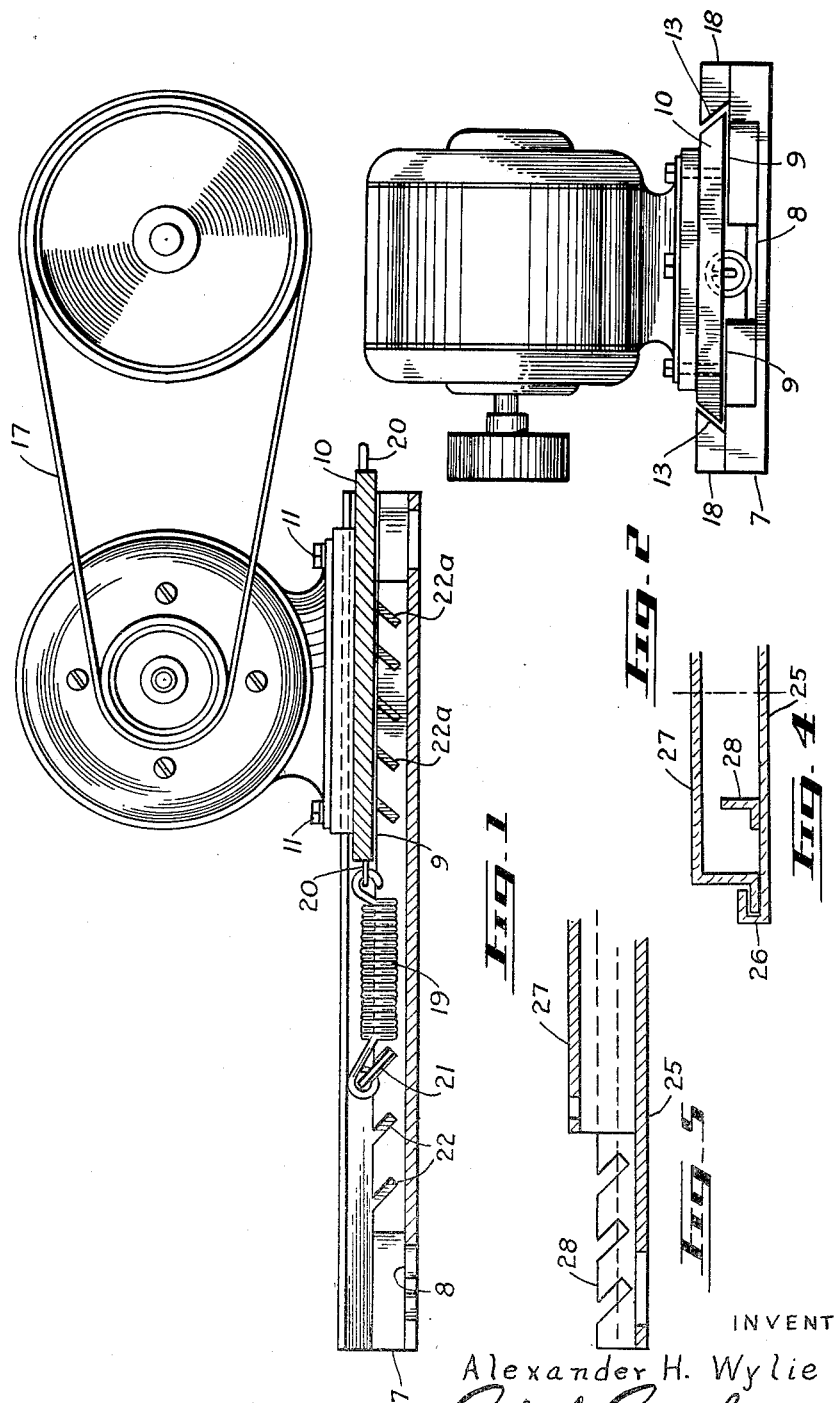
INVENTOR
Alexander H. Wylie
Ralph Burch
Attorney April 6, 1954      A. H. WYLIE      2,674,425
QUICK CHANGE MOTOR MOUNT WITH AUTOMATIC BELT TIGHTENER
Filed March 2, 1951      2 Sheets-Sheet 2
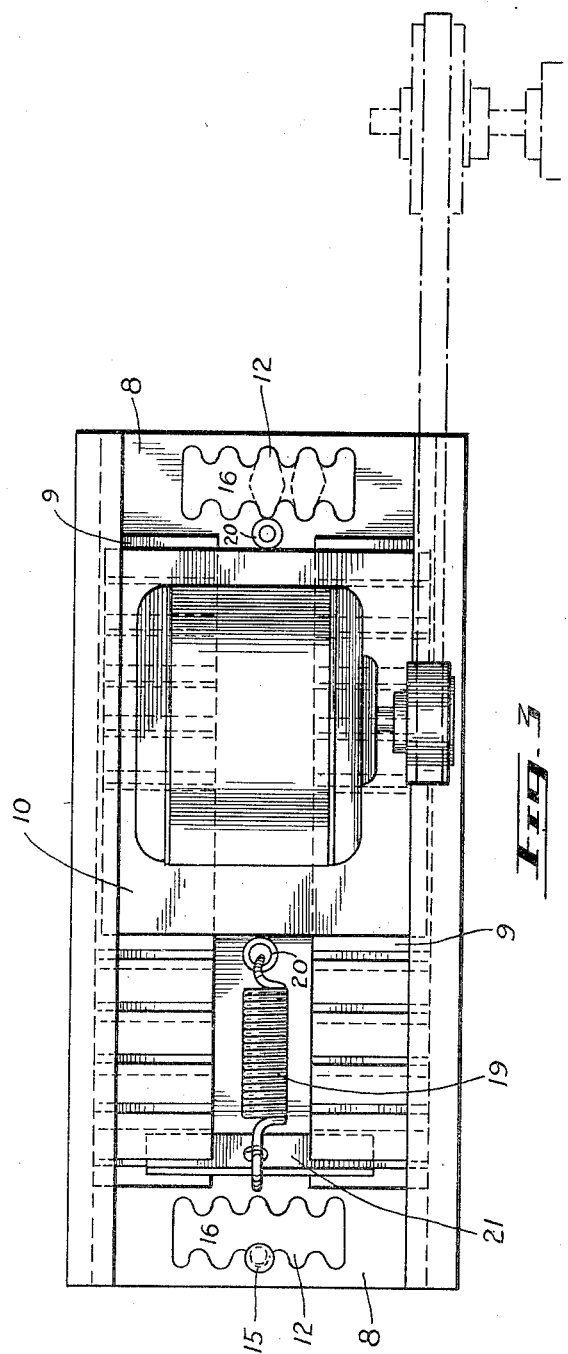
INVENTOR
Alexander H. Wylie
Ralph Burch
Attorney Patented Apr. 6, 1954

2,674,425

UNITED STATES PATENT OFFICE 2,674,425

QUICK CHANGE MOTOR MOUNT WITH AUTOMATIC BELT TIGHTENER

Alexander Hugh Wylie, Ottawa, Ontario, Canada

Application March 2, 1951, Serial No. 213,631

2 Claims. (Cl. 248—23)

This invention relates to a quick change motor mount with automatic belt tightener.

It is primarily intended for use in small workshops where there is a variety of machines, which are not required continuously, and it is economical to use one motor, and change it from one machine to another when required.

The object of my invention is to provide a device, which will make the changing of the motors quickly attained.

A further object is to provide a device which will give the desired tension on the driving belt from the motor to the machine.

A further object is to quickly move the motor laterally to bring the motor pulley in line with the pulley of the machine which is driven as is sometimes required, for tilting arbors or step pulleys.

With these and other objects in view that may appear while the description proceeds the invention consists in the novel arrangement of cooperating parts shown in the accompanying drawings forming part of this application and in which:

Fig. 1 is a longitudinal section through the device showing motor and driven machine pulley;

Fig. 2 is an end elevation of Fig. 1;

Fig. 3 is a plan view of the device;

Fig. 4 is a fragmentary cross section of the device made of sheet material;

Fig. 5 is a longitudinal section of the device made of sheet material.

Referring more in detail to the drawings in which similar reference characters designate corresponding parts throughout the several views it will be seen the invention comprises a base member 7 of longitudinal rectangular shape, the surface 8 is substantially lower than the surface portion 9 of the base member 7 which slidably supports the motor support member 10 to which the electrical motor is attached by securing means 11.

The said surface 8 is of broadened H-shape, the lateral surface of the H-shape having elongated apertures 12, and the longitudinal surface being adapted to contain the spring 19.

The elongated apertures 12 are formed with notched longitudinal edges for the purpose of detachably securing the base 7 to a bench in the following manner.

Securing means 15 are permanently fixed on the various benches for particular machines, said securing means 15 are fixed in a line at right angles to the shaft to be driven from the motor. Said securing means 15 are spaced apart to a distance equal to that between the centers of the elongated apertures 12. The said securing means 15 are provided with heads substantially larger than the body of the screw, but not larger than the center 16 of elongated apertures 12.

In operation the device is placed so the elongated apertures 12 of the base member engage over the securing means 15, and the tension of the driving belt 17 pulls the base member until the notches of said apertures 12 seat in the body of the said securing means 15, the heads of said securing means holding the base to the surface of the bench.

The notches of elongated apertures 12 are formed to fit the body of the securing means 15, but the apertures are enlarged centrally to allow the enlarged heads of the securing means 15 to pass.

For convenience and speed in moving the base laterally the central portion of the elongated apertures 12 is of a width to form a channel 16 to permit the device to be moved laterally without raising it from the bench.

The motor support member 10 to which the motor is attached, is of rectangular shape, with the sides formed angularly in the manner of a lathe bed inverted and the base member 7 is formed to slidably retain the said motor support 10 on the surface 9 preferably by detachable members 18 fixed to said base member 7 by securing means, said detachable members 18 can be arranged to take up any wear of the angular surface 13, on said detachable members 18 and on motor support member 10.

When the base member 7 is secured to the bench by the securing means 15 the desired tension of the belt 17 is obtained by means of the spring 19, one end of said spring 19 being attached to a hook 20 or other suitable means on the motor support member 10, the other end of said spring being attached centrally to a cross bar 21, the outer ends of said cross bar 21 being retained in the angular slots 22 which are sloped inwardly towards the center of the base member 7, by moving the cross bar 21 from one pair of slots 22 to another pair of slots, the tension of the driving belt 17 can be varied as desired.

The base member 7 is constructed so that the motor can drive a machine placed in position opposite to that shown in Fig. 1, by attaching the spring 19 to a hook 20 at the other end of the motor support member 10 and placing the cross bar 21 into angular slots 22a.

Figures 4 and 5 illustrate the construction of my device when made of sheet material, the sides of the base member 25 being folded over at 26, to slidably receive the base of the Z-shaped sides of the motor support member 27. A plurality of angularly disposed slots in the longitudinal member 28 beneath the motor support member retain the ends of the cross bar 21.

It is believed that the construction and advantages of the structure shown may be apparent from the foregoing paragraphs taken in conjunction with the accompanying drawings without further detailed description.

While the preferred embodiment of the invention has been disclosed it is understood that minor changes in the details of construction, combination and arrrangement of co-operating parts may be resorted to within the scope of what is claimed without departing from the spirit of the invention.

I claim:

1. A quick change motor mount with automatic belt tightener comprising an elongated rectangular base member, a rectangular motor support member, means for detachably securing said base member to a bench, said means comprising an elongated aperture formed adjacent each end of said base member adapted to receive fasteners permanently fixed to a bench and spaced apart a distance equal to the distance between the centers of said apertures, said apertures having notched longitudinal edges to removably receive said fasteners to permit said base member to be moved laterally, angularly shaped sides on said motor support member wider on the underside than the top, members on the sides of said base member cooperating with said angularly shaped sides to slidably retain said motor support member, longitudinal members beneath said motor support member having spaced angular slots, a coil tension spring attached by one extremity to a cross bar disposed in said angular slots of said longitudinal members, the opposite extremity of said coil tension spring being attached to said motor support member.

2. A quick change motor mount with automatic belt tightener construcsted of sheet material comprising an elongated rectangular base member, a rectangular motor support member, means for detachably securing said base member to a bench, said means comprising an elongated aperture formed adjacent each end of said base member adapted to receive fasteners permanently fixed to a bench and spaced apart a distance equal to the distance between the centers of said apertures, said apertures having notched longitudinal edges to removably receive said fasteners to permit said base member to be moved laterally, means to slidably retain the said motor support member on said base member comprising Z-shaped sides, on said motor support member and folded over edges on the said base member cooperating with said Z-shaped sides, longitudinal members beneath said motor support member having spaced angular slots, a coil tension spring attached by one extremity to a cross bar disposed in said angular slots of said longitudinal members, the opposite extremity of said coil tension spring being attached to said motor support member.

References Cited in the file of this patent

UNITED STATES PATENTS

| Number | Name | Date |
|---|---|---|
| 1,570,591 | Mercer | Jan. 19, 1926 |
| 1,971,134 | Davis | Aug. 21, 1934 |
| 2,196,891 | Berndt | Apr. 9, 1940 |
| 2,201,831 | Jacque | May 21, 1940 |

FOREIGN PATENTS

| Number | Country | Date |
|---|---|---|
| 96,729 | Austria | Apr. 25, 1924 |